US008915180B2

(12) United States Patent
Jacob

(10) Patent No.: US 8,915,180 B2
(45) Date of Patent: Dec. 23, 2014

(54) AUTONOMOUSLY ROTATING COOKWARE

(76) Inventor: William J. Jacob, Kansas City, MO (US)

( * ) Notice: Subject to any disclaimer, the term of this patent is extended or adjusted under 35 U.S.C. 154(b) by 609 days.

(21) Appl. No.: 13/004,023

(22) Filed: Jan. 10, 2011

(65) Prior Publication Data

US 2011/0168725 A1 Jul. 14, 2011

Related U.S. Application Data

(60) Provisional application No. 61/293,584, filed on Jan. 8, 2010.

(51) Int. Cl.
A47J 37/04 (2006.01)

(52) U.S. Cl.
CPC .............. *A47J 37/041* (2013.01); *A47J 37/046* (2013.01)
USPC .......................................................... 99/450

(58) Field of Classification Search
USPC ....... 99/391, 392, 393, 395, 397, 419, 421 R, 99/422, 477, 478, 479; 220/573.2, 573.1, 220/912
IPC .................... A21B 3/155; A47J 37/067,37/0704
See application file for complete search history.

(56) References Cited

U.S. PATENT DOCUMENTS

| | | | | |
|---|---|---|---|---|
| 3,221,638 | A * | 12/1965 | Wickenberg | 99/340 |
| 3,503,323 | A * | 3/1970 | Swetlitz | 99/352 |
| 4,330,696 | A * | 5/1982 | Pomeroy et al. | 219/755 |
| 4,456,805 | A * | 6/1984 | Jorgensen et al. | 219/755 |
| 5,419,788 | A * | 5/1995 | Thoma et al. | 148/402 |
| 5,799,569 | A * | 9/1998 | Moreth | 99/421 H |
| 5,845,563 | A * | 12/1998 | Haring et al. | 99/419 |
| 6,382,085 | B1 * | 5/2002 | Dotan | 99/331 |
| 6,689,486 | B2 * | 2/2004 | Ho et al. | 428/610 |
| 6,946,040 | B2 * | 9/2005 | Homma | 148/563 |
| 7,501,032 | B1 * | 3/2009 | Noebe et al. | 148/402 |
| 7,798,057 | B2 * | 9/2010 | Ritterling | 99/330 |
| 2004/0074435 | A1 * | 4/2004 | Kaiser et al. | 116/216 |
| 2004/0182254 | A1 * | 9/2004 | Gershon | 99/419 |
| 2007/0137498 | A1 * | 6/2007 | Sarich | 99/419 |
| 2009/0171294 | A1 * | 7/2009 | Johnson et al. | 604/164.13 |

* cited by examiner

*Primary Examiner* — Dana Ross
*Assistant Examiner* — Frederick Calvetti

(57) ABSTRACT

An autonomously rotating cookware adapted to more evenly cook a food item within a cooking space presenting variable temperatures, includes a rotatable member and a thermally activated active material element, such as a shape memory alloy wire, drivenly coupled to the member, such that heat by-product during the cooking process causes the element to activate and activating the element causes the member to rotate, so that the food item is alternatively exposed to the variable temperatures.

18 Claims, 3 Drawing Sheets

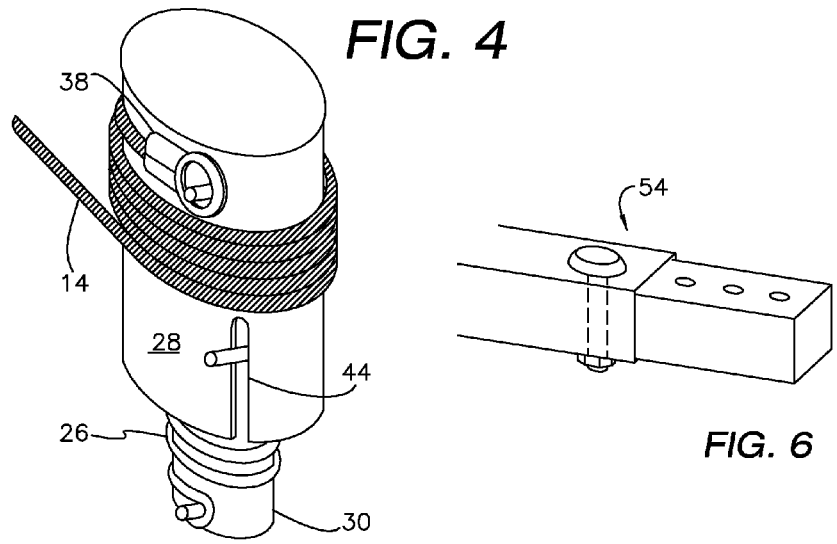
FIG. 4
FIG. 6
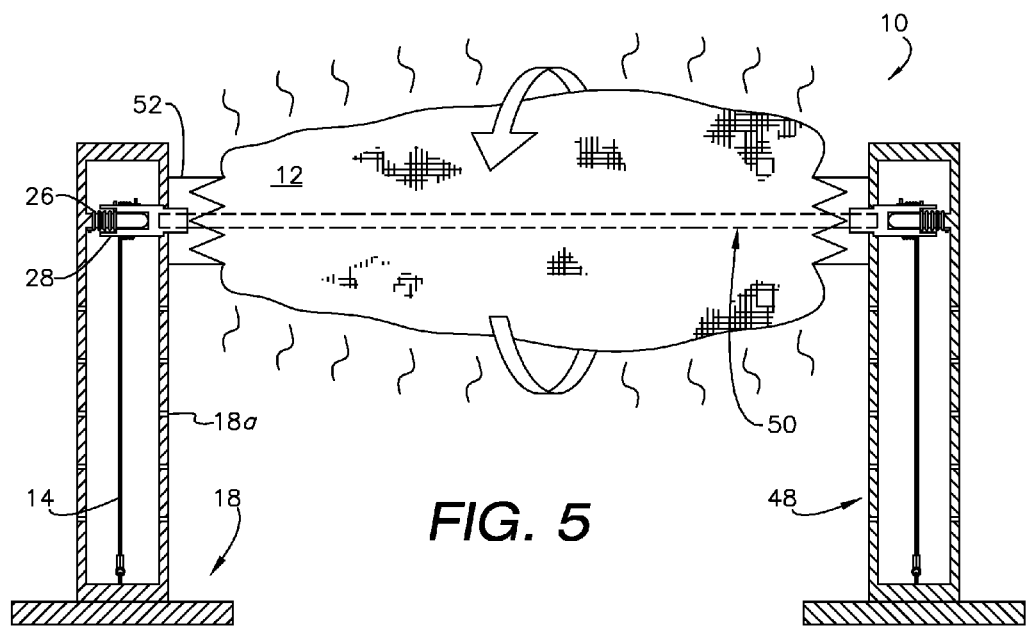
FIG. 5

AUTONOMOUSLY ROTATING COOKWARE

CROSS REFERENCE TO RELATED APPLICATIONS

This patent application claims priority to U.S. Provisional application Ser. No. 61/293,584, entitled "Autonomously Rotating Cookware", and filed on Jan. 8, 2010, the disclosure of which is hereby incorporated by reference.

BACKGROUND OF THE INVENTION

1. Field of the Invention

The present disclosure generally relates to cookware and methods of cooking, and more particularly, to cookware that utilize active material actuation to autonomously rotate a food engaging surface.

2. Discussion of Prior Art

There is a long felt need to evenly cook food in preparation for consumption. Due to temperature variations within cooking spaces, however, uneven cooking remains a concern in the art. For example, where a first portion of the food is constantly exposed to a region near the heat source, it may experience a greater than mean temperature, while a second portion constantly exposed to another region, e.g., remote from the source and/or near ambient conditions, experiences a lesser than mean temperature. A practice of flipping or turning the food manually has long been developed, but this typically results in a loss of heat energy. Moreover, the requirement of manual labor exposes the operator to the high temperatures and hot surfaces of the cooking space. As a result, rotatable cookware have more recently been developed to rotate food within the cooking space, either horizontally or vertically, so that the portions of the food are alternatively exposed to the variable temperatures of the space. Even where uniform temperature is provided, this method of cooking is used to facilitate basting and cooking certain food items in their own juices. Concernedly, however, conventionally rotatable cookware may also require manual labor, or where autonomous, feature an electro-mechanical actuator that consumes additional energy, and introduces a plurality of moving parts into the cooking space.

BRIEF SUMMARY OF THE INVENTION

The present invention addresses these and other concerns by providing autonomously rotating cookware that utilize active material actuation to rotate a food-engaging surface. The inventive cookware introduced herein utilize heat by-product from the cooking process to thermally activate an active material element and drive rotation, thereby saving energy in comparison to prior art rotatable cookware. The invention is further useful for providing an automatic mode of returning the cookware to the home position when removed from the cooking space, so as to be ready for future use. As such, the present invention provides better-prepared food, reduces exposure to hot surfaces and high temperatures during the cooking process, and takes advantage of heat energy waste produced during the cooking process.

In general, the inventive cookware is adapted for cooking a food item within a cooking space presenting variable temperatures. The cookware includes a stationary part securely positionable within the space, and a member rotatably coupled to the stationary part, and configured to support the food item, when the cookware is in the space. Finally the cookware includes a novel actuator comprising a thermally activated smart (i.e., "active") material element that is drivenly coupled to the member such that activation (or deactivation) causes the member to rotate relative to the part. The part, member, and actuator are therefore cooperatively configured to autonomously rotate the food item within the space, once a predetermined temperature is achieved.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 4 is an enlarged perspective view of the actuator and return mechanism shown in FIG. 2;

FIG. 5 is a cross-sectional elevation of an autonomously rotating cookware presenting a horizontal rotisserie including first and second towers and a spit interconnecting the towers, wherein each tower includes an actuator comprising a shape memory alloy wire, and a return mechanism comprising a torsion spring, and a food item being rotated and cooked thereupon, in accordance with a preferred embodiment of the invention;

FIG. 6 is a partial perspective view of a pin and hole adjustment mechanism adapted for use with the towers and/or spit, in accordance with a preferred embodiment of the invention;

DETAILED DESCRIPTION OF THE INVENTION

Figure 1:
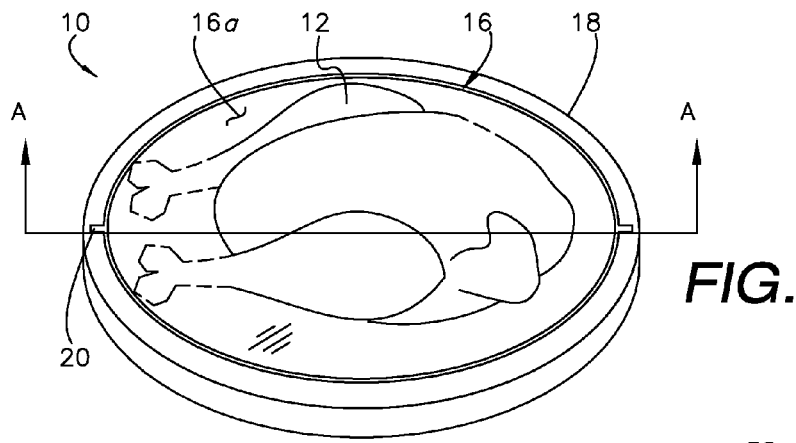
FIG. 1 is a perspective view of an autonomously rotating cookware presenting a baking sheet, and a food item being rotated and cooked thereupon, in accordance with a preferred embodiment of the invention.

The following description of the preferred embodiments is merely exemplary in nature and is in no way intended to limit the invention, its application, or uses. As described and illustrated herein, a novel cookware 10 (FIGS. 1-7) is adapted for use during a cooking process wherein a cooking space presenting a predetermined mean temperature is achieved, and as such, is advantageously suitable for use with conventional ovens, barbeque grills, etc. More particularly, the present invention is suitable for use in a non-uniform cooking space presenting a plurality of variable final temperatures (e.g., an oven defining "hot spots"). In general, the inventive cookware 10 utilizes smart (i.e., "active") material actuation to produce rotational displacement and thereby rotate a food item 12, such as a turkey (FIG. 1), roast (FIG. 5), cookies, a conventional baking dish, pot, or pan (and its contents) placed thereupon, etc. When the active material is subsequently deactivated, e.g., by removing the cookware 10 from the cooking space and allowing it to cool, the cookware 10 is enabled and/or caused to automatically reset.

As such, active materials suitable for use in the present invention include thermally activated active materials, such as shape memory materials, having an activation temperature within the range of temperatures achieve by the cooking space. Among shape memory materials, shape memory alloys are particularly suitable for use.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed.

In the exemplary embodiments shown in FIGS. 1-8, the cookware 10 includes a shape memory alloy actuator 14 that is drivenly coupled to a rotating member 16. The actuator 14 is shown in the form of a spooled wire throughout the embodiments, however, it is certainly appreciated that other actuator forms, such as torque tubes, etc. operable to generate greater than 360, more preferably, 720, and most preferably, 1080 degrees of rotation over the cooking process may be used. As used herein the term "wire" is non-limiting, and shall include other similar geometric configurations presenting tensile load strength/strain capabilities, such as cables, bundles, braids, ropes, strips, chains, and other elements.

Figure 2:
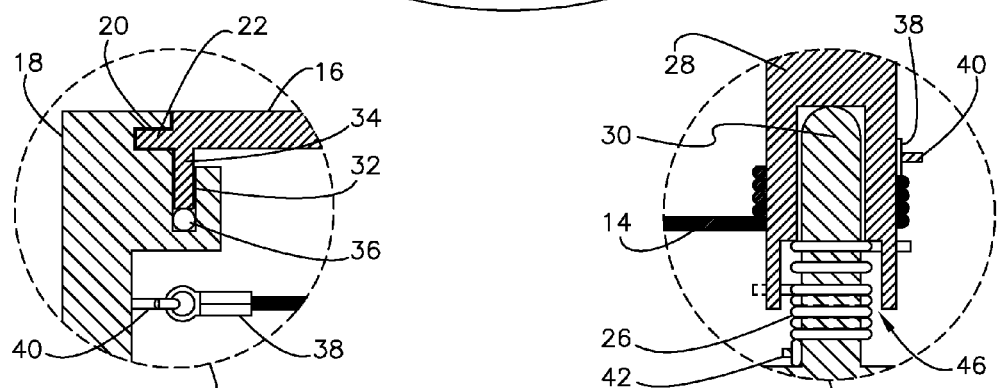
FIG. 2 is a cross-section of the cookware shown in FIG. 1 taken along line A-A therein, showing the interior of the cookware, and particularly showing in enlarged caption view an actuator comprising a shape memory alloy wire, a return mechanism comprising a torsion spring, and a perimeter recess and lip in rolling engagement, in accordance with a preferred embodiment of the invention.

In the exemplary embodiment illustrated in FIGS. 1-4, a circular baking sheet 10 is shown, wherein an upper food engaging surface 16a, defined by a planar rotating member 16 is rotatably coupled to a stationary part (or base) 18 and drivenly coupled to the active material actuator 14. The preferred part 18 and member 16 present interlocking capability so as to provide secure interconnection once assembled. In FIG. 1, for example, the part 18 defines a plurality of notches 20, and the member 16 defines at an equal plurality of radially extending rollers (e.g., flat tabs, stationary pins, etc.) 22. The part 18 and member 16 are cooperatively configured such that the rollers 22 and notches 20 are alignable when rotated past home, such that the rollers 22 can be passed through notches, and the member 16 set into a flush position with the part 18 (FIG. 2). As a result, the rollers 22 provide rolling engagement between the member 16 and part 18. When the rollers (or tabs, etc.) 22 and notches 20 are misaligned, the member 16 is unable to vertically displace relative to the part 18, thereby interlocking the two components.

To protect them from food deposits and damage occurring due to handling, the member 16 and part 18 cooperatively define an interior compartment 24, wherein the actuator 14 and a return mechanism 26 are functionally disposed. As shown in FIGS. 2, 4, and 5, the part 18 and member 16 may cooperatively define a female receptacle 28 (shown distending from the member 16), and a male prong 30 (shown extending from the part 18), within the compartment 24. The prong 30 is configured to be tightly received by the receptacle 28, so as to enable rotation but limit lateral displacement. To facilitate rotation the prong 30 is preferably rounded at its distal member engaging end (FIG. 2). Alternatively, a bearing (not shown) may be provided at the distal end.

Figure 2A:
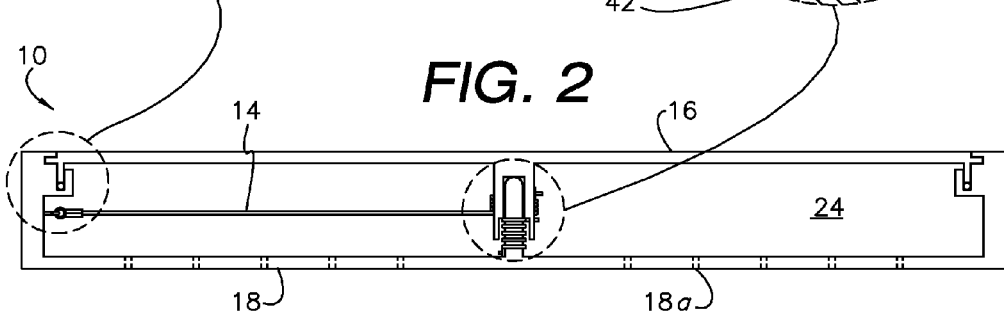
FIG. 2a is a partial cross-section of an autonomously rotating baking pan similar in function to the cookware shown in FIGS. 1 and 2.
Figure 2A:
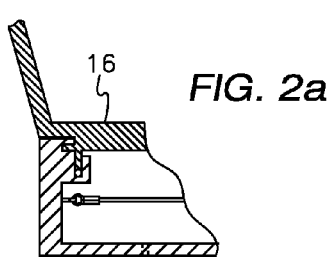
Figure 3:
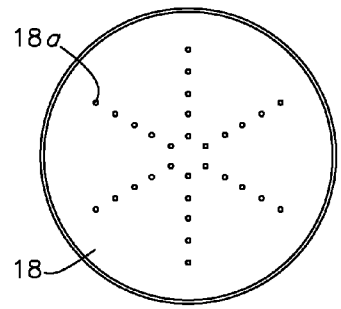
FIG. 3 is a bottom view of an autonomously rotating cookware, such as that shown in FIGS. 1-2a, presenting an exemplary inlet hole pattern, in accordance with a preferred embodiment of the invention.

To further limit lateral translation the part 18 and member 16 further define a recess 32 and a lip 34 disposed within the recess 32. The lip 34 races within the recess 32 during rotational displacement. In FIGS. 2 and 2a, the part 18 defines the recess 32 and the member defines a distending lip 34. More preferably, a plurality of ball bearings 36 are disposed within the recess 32 intermediate the lip 34 and part 18, as also shown, so as to effect rolling engaging therebetween. Alternatively, a solid lubricant or other low friction element may be used. The part 18, member 16, ball bearings 36, and innerworkings/structure of the cookware 10 are made of suitable material (e.g., aluminum, iron, hard plastic, etc.) able to withstand the maximum temperatures of the cooking space. Finally, to accelerate thermal activation of the SMA actuator 14 within the compartment 24 a plurality of fluid inlets 18a are preferably defined by the part 18 (FIG. 3).

In FIG. 2, the actuator 14 presents at least one SMA wire spooled about the receptacle 28, and interconnected to the member 16 and part 18. Reinforced end connectors 38 are preferably provided to increase the structural capacity and durability of the wire 14. More particularly, and as shown in FIGS. 2 and 4, O-ring crimp connectors 38 may be provided at each end of the wire 14, and configured to engage pins (or hooks) 40 attached to or defined by the receptacle 28 and part 18. The connectors 38 and receptacle 28 are preferably formed of thermally non-conductive material, and the wire 14 is otherwise spaced from the part 18 and member 16, so that the wire 14 is primarily heated through convection. As such, it is appreciated that the wire temperature 14 will more closely match that of the air within the cooking space.

The wire 14 is configured, with respect to chemical composition, to present the intended transition temperature range and period necessary to effect rotation at the targeted temperature and during the desired portion (e.g., 100%) of the cooking process. That is to say, the wire 14 is configured to slowly recover its available strain, so as to unravel from the receptacle 28, over the desired portion of the cooking process. As such, it is preferable that the transition temperature be within the range of 60 to 85% of the mean final temperature of the cooking space. The preferred wire 14 presents a geometric configuration and chemical composition operable to result in multiple revolutions over a period greater than the cooking process, so that the food item 12 is essentially always rotating while cooking. It is appreciated that the actuator 14 may comprise a plurality of wires that differ (e.g., in diameter, composition, insulation, etc.) to effect sequential actuation, and a ratcheting rotation effect over the cooking period. Moreover, due to a wide variety of cooking temperatures and times, it is appreciated that a plurality of differing cookwares 10 may be required to effectively serve each.

Whereas baking processes performed within conventional ovens typically present a mean final temperature not less than 300° F. (i.e., 149° C.), and a cooking period between 15 minutes to 2 hours, the SMA wire 14 for this intended purpose, is preferably configured to present a transition temperature within 225° to 280° F. (102° to 140° C.), and a plurality of revolutions over 2 hours with the first occurring within 30 minutes. It is appreciated that the number of wraps around the receptacle 28 will result in the number of revolutions performed by the member 16, so long as the available strain within the wire 14 is greater than the length of the wrapped portion of the wire 14. In FIG. 4, for example, five and one-half revolutions will be provided if the length of the wrapped portion shown is less than 8% (or the available strain) of the wire length. It may be necessary for the wire 14 to be doubled over or made to run along the perimeter of the part 18, by additional hooks (not shown) to provide the necessary length. In barbeque applications, the spooled wire actuator 14 may present a lower transition temperature of 180° F. (82° C.) and be configured to effect a plurality of revolutions over longer cooking periods (e.g., 2 to 6 hours). For other types of cooking, such as grilling or roasting, the transition temperature of the wire 14 is increased accordingly.

Figure 8:
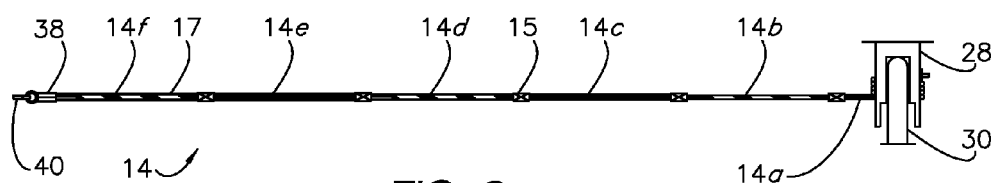
FIG. 8 is an elevation of a wire actuator formed of multiple segments presenting differing thermal profiles, in accordance with a preferred embodiment of the invention.

As shown in FIG. 8, it is appreciated that the wire 14 may comprise of multiple shape memory segments 14a-f, wherein the segments are interconnected by rigid links 15. In this configuration, each segment may present a differing thermal profile when exposed to a constant transition temperature, so as to result in sequential recovery of their respective available strains and incremental rotation based on the timing of the respective profiles. More preferably, the segments 14a-f are configured to recover their strains from right to left (i.e., beginning from the segment proximate the receptacle, and shown as 14a in FIG. 8), so that upon actuation a Martensitic segment is not intermediate the actuating segment and rotating member 16. Differing thermal profiles may be accomplished, for example, by providing differing segment diameters and/or applying differing amounts of a thermally non-conductive or retardant material on at least a portion of the outer surfaces of the segments 14a-f. In FIG. 8, segment pairs 14a and b, c and d, and e and f present differing diameters respectively, and segments 14b, d, and f are at least partially wrapped by a compressive thermally insulative layer 17. Alternatively, a portion of the segments 14a-f may be submerged in a fluid, encased in a body, or interiorly disposed within a spring (not shown) that is further overlaid with thermally insulative layer. With respect to the latter, it is appreciated that the spring will further provide a return force, once the segment is deactivated.

The actuator 14 may further include a mechanical advantage, transmission, mechanical linkage system, and/or otherwise retarding agent (not shown) that is configured to produce the intended gradual recovery, and as such is operable to convert a generally instantaneous transition period into gradual motion over time. Alternatively, it is appreciated that the wire 14 may be used to timely (i.e., at a desired temperature) release stored energy operable to effect the intended gradual rotation.

A return mechanism 26 in the form of a torsion spring is shown in FIGS. 2, 4, and 5, and configured to bias the member 16 towards a home position wherein the wire 14 is pre-stretched and the spring 26 retains no energy. It is appreciated that the wire 14 and spring 26 are able to rotate past the home position in order to align the rollers 22 and notch 20 as previously mentioned. In the illustrated embodiment, the spring 26 engages a pin 42 defined by the prong 30 at its lower end, and presents an opposite free end. In normal operation, the torsion spring 26 is coupled to the receptacle 28, so as to be caused to store energy when the wire 14 contracts and the member 16 rotates. As such, it is appreciated that the spring modulus of the spring 26 and the actuation force provided by the wire 14 are cooperatively configured to effect the intended function. The free end of the spring 26 is disposed within a slot 44 defined by the receptacle 28. This enables the free end to vertically displace during rotation, as is necessary and shown by hidden-line type in the caption of FIG. 2.

Once the wire 14 is deactivated, the spring 26 causes the member 26 to return to the home position, by overcoming the elastic modulus of the Martensitic SMA material and stretching the wire 14 back to its original length. Alternatively, it is appreciated that a two-way shape memory wire 14 may be used, so that the spring 26 is not required to stretch or return the wire 14 to its original length, but instead solely functions to wrap the slacked wire 14 around the receptacle 28. Finally, the receptacle 28 preferably defines a larger interior diameter or cut-out 46 adjacent its lower end, so that a tight fit may be achieved with the prong 30 at its upper end, while allowing the torsion spring 26 to function freely (FIG. 2).

In FIG. 5, the cookware 10 presents a horizontal rotisserie, such as typically used in barbeque or smoking applications. Here, the actuator 14 and return mechanism 26 are similar in geometric configuration and application to the embodiment of FIGS. 1-4, and as such will not be further described herein. The stationary part 18, in this configuration, includes first and second spaced towers 48, and the rotating member 16 includes an interconnecting spit 50. As with conventional rotisseries the spit 50 is configured to pass through and support the food item 12. One or both towers 48 may define an interior compartment 24, and have an autonomously activated smart material actuator (e.g., a spooled SMA wire) 14 and return mechanism (e.g., torsion spring) 26 disposed therein.

The actuator(s) 14 and mechanism(s) 26 are drivenly coupled to the spit 50, and, where two are provide, are configured to function oppositely, so as to congruently drive spit rotation. Where non-uniform heating of redundant actuators 14 occurs, it is appreciated that slack will form in the cooler actuator 14, and the spit 50 will be driven by the other. Again, the part 18 preferably defines a plurality of inlets 18a to allow heated fluid to enter the compartment 24. As with conventional rotisseries sharp clamps 52 (FIG. 5), a basket (not shown), spokes (also not shown) may be used in addition to or in lieu of the spit 50 to aid in grabbing the food item 12. Finally, it is also appreciated that the spit 50 and/or towers 48 are preferably adjustable so as to facilitate use with a variety of food items 12 presenting differing dimensions. For example, where the spit 50 and/or towers 48 define a plurality of alignable holes, a pin fastener 54 (FIG. 6) may be used for adjustment. Similarly, the cookware 10 may present a vertical rotisserie, such as used to cook lamb meat for gyros.

Figure 7:
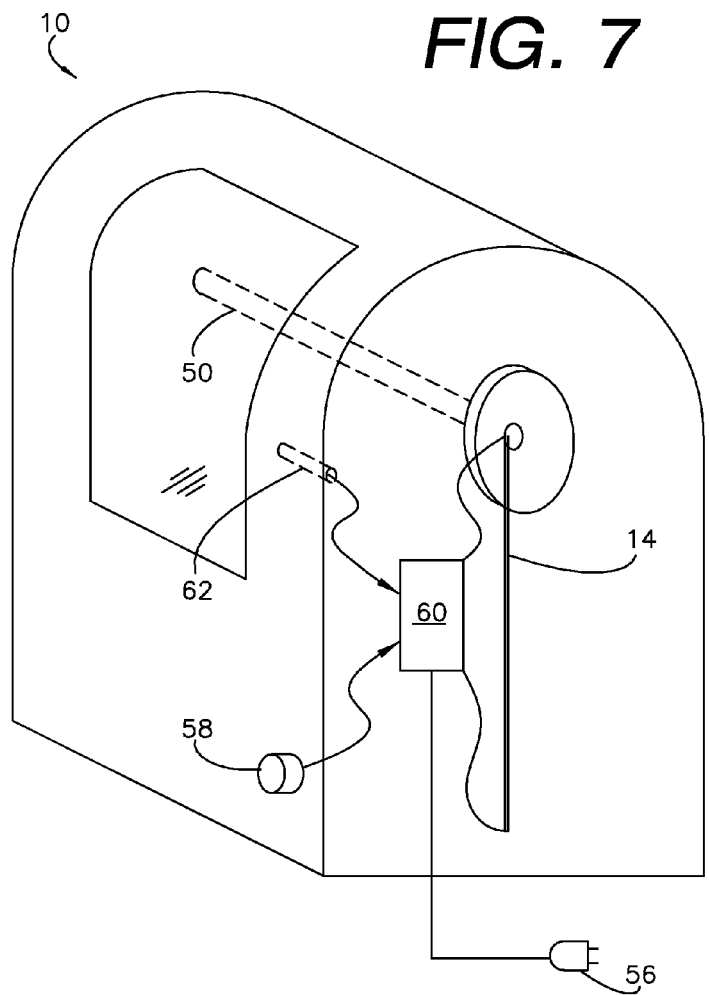
FIG. 7 is a perspective view of an actively controlled autonomously rotating cookware presenting a stand-alone rotisserie that includes an electric power supply, and uses joule heating to effect rotation, in accordance with a preferred embodiment of the invention.

Thus, the present invention is intended to use heat by-product from the cooking process to activate the material, thereby increasing energy efficiency and requiring no additional energy source. Alternatively, however, it is appreciated that Joule heating can be used to make the entire system electronically controllable, such as with respect to a stand-alone rotisserie 10 (FIG. 7). Here, electric leads may be connected to and configured to selectively feed a current generated by an electric power source 56 through the wire 14. By modifying (e.g., reducing, increasing, terminating, etc.) the current, the rate of rotation may be controlled. As such, the cookware 10 in this configuration further includes a manual input device 58, such as a rheostat, and/or a programmable controller 60 communicatively coupled to the power source 56 and at least one sensor 62, such as a thermometer configured to determine the interior compartment temperature.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable. The term "cookware" is used to denote both a single cooking utensil and a plurality of cooking utensils herein.

What is claimed is:

1. A cookware adapted for evenly cooking a food item within a cooking space presenting variable temperatures, said cookware comprising:
   a stationary part securely positionable within the space;
   a member rotatably coupled to the stationary part, positionable within the space, and configured to support the food item; and
   an actuator comprising a martensitic shape memory alloy element operable to undergo a reversible change in fundamental property when exposed to and/or occluded from a thermal activation signal,
   said actuator being drivenly coupled to the member, and anchored to the part,
   said part, member, and actuator being cooperatively configured such that the element is thermally exposed to the space, the temperatures produce the signal, and the change autonomously causes the member to rotate relative to the part, when the cookware and food item are placed within the space.

2. The cookware as claimed in claim 1, wherein the member defines a vertical axis of rotation.

3. The cookware as claimed in claim 2, wherein the part and member compose a circular baking pan or sheet, or a vertical rotisserie.

4. The cookware as claimed in claim 3, wherein the part presents a shallow cylinder having an outside perimeter and defines a shallow recess along the perimeter, the member is generally planar, presents a circular configuration and defines a transverse lip, and the lip is translatably disposed within the recess so as to enable rotational displacement and not longitudinal displacement between the member and part.

5. The cookware as claimed in claim 4, further comprising:
a low friction element disposed within the recess intermediate the part and member.

6. The cookware as claimed in claim 5, wherein the low friction element is selected from the group consisting essentially of a plurality of ball bearings, and a solid lubricant.

7. The cookware as claimed in claim 1, wherein the member defines a female receptacle and the part defines a male prong at least partially insertable within the receptacle, and the prong and receptacle are coaxially aligned with the axis, so as to enable rotation but not lateral translation therebetween.

8. The cookware as claimed in claim 7, wherein the element is a shape memory alloy wire interconnecting the part and member, and at least partially wound about the axis.

9. The cookware as claimed in claim 8, wherein the wire presents two-way shape memory.

10. The cookware as claimed in claim 1, wherein the element is a shape memory alloy wire, the temperatures define a mean final temperature, and the wire presents a transition temperature within the range 60 to 85% of the mean final temperature.

11. The cookware as claimed in claim 1, wherein the wire defines distal end points, and the actuator further includes reinforcing connectors at the points.

12. The cookware as claimed in claim 11, wherein the connectors are thermally non-conductive, and the wire is spaced from the part and member.

13. The cookware as claimed in claim 12, said part and member defining an interior compartment, wherein the wire is disposed.

14. The cookware as claimed in claim 1, further comprising:
a return mechanism drivenly coupled to the member antagonistically to the actuator,
said actuator and mechanism being cooperatively configured such that the mechanism produces a biasing force that drives the member towards a home position, the change produces an actuation force greater than the biasing force, so as to cause rotational displacement away from the home position, and the biasing force is configured to return the member to the home position when the change is reversed.

15. The cookware as claimed in claim 14, wherein the mechanism is a torsion spring, and the change is further operable to store energy within the spring.

16. The cookware as claimed in claim 1, wherein the member defines a horizontal axis of rotation.

17. The cookware as claimed in claim 16, wherein the member and part compose a horizontal rotisserie.

18. A cookware adapted for evenly cooking a food item within a cooking space, said cookware comprising:
a stationary part securely positionable relative to the space;
a member rotatably coupled to the stationary part, and configured to support the food item;
an actuator comprising a martensitic shape memory alloy element operable to undergo a reversible change in fundamental property when exposed to and/or occluded from a thermal activation signal, and drivenly coupled to the member such that the change causes the member to rotate relative to the part, wherein said part, member, and actuator are cooperatively configured to rotate the food item within the space as a result of the change; and
an active control configured to receive an input, and selectively cause the change upon receipt of the input.

\* \* \* \* \*